US010816787B2

(12) United States Patent
Mazilu et al.

(10) Patent No.: US 10,816,787 B2
(45) Date of Patent: Oct. 27, 2020

(54) AIRY BEAM LIGHT SHEET AND AIRY BEAM LIGHT SHEET MICROSCOPE

(71) Applicant: UNIVERSITY COURT OF THE UNIVERSITY OF ST ANDREWS, St Andrews, Fife (GB)

(72) Inventors: Michael Mazilu, Fife (GB); Tom Vettenburg, Fife (GB); Kishan Dholakia, Fife (GB); Miguel Preciado, Fife (GB); Zhengyi Yang, Fife (GB)

(73) Assignee: UNIVERSITY COURT OF THE UNIVERSITY OF ST ANDREW, St Andrews (DE)

( * ) Notice: Subject to any disclaimer, the term of this patent is extended or adjusted under 35 U.S.C. 154(b) by 0 days.

(21) Appl. No.: 16/433,429

(22) Filed: Jun. 6, 2019

(65) Prior Publication Data
US 2019/0361214 A1    Nov. 28, 2019

Related U.S. Application Data

(62) Division of application No. 15/326,073, filed as application No. PCT/GB2015/052186 on Jul. 29, 2015, now Pat. No. 10,353,188.

(30) Foreign Application Priority Data

Jul. 30, 2014   (GB) .................................. 1413500.8

(51) Int. Cl.
G02B 26/00    (2006.01)
G02B 26/08    (2006.01)
(Continued)

(52) U.S. Cl.
CPC ......... *G02B 21/06* (2013.01); *G02B 21/0032* (2013.01); *G02B 21/0076* (2013.01);
(Continued)

(58) Field of Classification Search
CPC ............ G02B 21/0032; G02B 21/0076; G02B 21/06; G02B 26/02; G02B 26/06;
(Continued)

(56) References Cited

U.S. PATENT DOCUMENTS 5,519,685 A    5/1996   Kato et al.
8,101,929 B1   1/2012   Christodoulides et al.
(Continued)

FOREIGN PATENT DOCUMENTS

CN    103018918 A    4/2013
CN    103048791 A1   4/2013
(Continued)

OTHER PUBLICATIONS

Acebal P et al.: "Generation of High-Quality Tunable One-Dimensional Airy Beams Using the Aberrations of a Single Lens", IEEE Photonics Journal, IEEE, USA, vol. 4, No. 5, Oct. 1, 2012 (Oct. 1, 2012), pp. 1273-1280 XP011488198, ISSN: 1943-0655, D01:10.1109/JPHOT.2012.2207712.
(Continued)

*Primary Examiner* — Brandi N Thomas
(74) *Attorney, Agent, or Firm* — Moore & Van Allen PLLC; W. Kevin Ransom

(57) ABSTRACT

An optical system for generating an Airy beam light sheet comprising an optical arrangement for generating a Gaussian beam, and an optical element for converting the Gaussian beam into an Airy beam light sheet, wherein a single optical element is provided for converting the Gaussian beam into an Airy beam light sheet.

19 Claims, 17 Drawing Sheets

(51) Int. Cl.
  *G02F 1/29*  (2006.01)
  *G02B 21/06* (2006.01)
  *G02B 21/00* (2006.01)
  *G02B 26/06* (2006.01)
  *G02B 27/09* (2006.01)
  *G02B 26/02* (2006.01)
  *G02B 27/30* (2006.01)

(52) U.S. Cl.
  CPC ............ *G02B 26/02* (2013.01); *G02B 26/06* (2013.01); *G02B 27/0927* (2013.01); *G02B 27/0944* (2013.01); *G02B 27/0966* (2013.01); *G02B 27/0988* (2013.01); *G02B 27/30* (2013.01)

(58) Field of Classification Search
  CPC ............ G02B 27/0927; G02B 27/0944; G02B 27/0966; G02B 27/0988; G02B 27/30; G02B 1/06; G02B 3/12; G02B 3/14; G02F 1/166; G02F 1/167; G02F 1/292
  USPC ........ 359/237, 242, 265–267, 290–292, 295, 359/298
  See application file for complete search history.

(56)  References Cited

U.S. PATENT DOCUMENTS

2013/0038574 A1* 2/2013 Chang .................. G06F 3/0418
                                                       345/174
2014/0146159 A1   5/2014 Liu et al.

FOREIGN PATENT DOCUMENTS

| CN | 103246009 A | 8/2013 |
|---|---|---|
| JP | 2003220488 A | 8/2003 |
| WO | 2011120582 A1 | 10/2011 |
| WO | 2013150273 A1 | 10/2013 |

OTHER PUBLICATIONS

Tom Vettenburg et al.: "Light-sheet microscopy using an Airy beam", Nature Methods, vol. 11, No. 5, Apr. 6, 2014 (Apr. 6, 2014), pp. 541-544, XP055217022, ISSN: 1548-7091, DOI: 10.1038/nmeth.2922.

John Broky et al.: "Self-healing properties of optical Airy beams", Optics Express, vol. 16, No. 17, Aug. 18, 2008 (Aug. 18, 2008), p. 12880, XP055065897, ISSN: 1094-4087, DOI: 10.1364/OE16.012880.

Jun Amako et al.: "Wave-Front Control Using Liquid-Crystal Devices", Applied Optics, Optical Society of America, Washington, DC; US, vol. 32, No. 23, Aug. 10, 1993 (Aug. 10, 1993), pp. 4323-4329, XP000383336, ISSN: 0003-6935.

University Court of The University of St Andrews, International Application No. PCT/GB2015/052186, International Search Report, dated Oct. 7, 2015.

University Court of The University of St Andrews, International Application No. PCT/GB2015/052186, Written Opinion, dated Oct. 7, 2015.

University Court of The University of St Andrews, International Application No. PCT/GB2015/052186, International Preliminary Report on Patentability, dated Jan. 31, 2017.

University Court of The University of St Andrews, Great Britain Application No. GB1413500.8, Search Report, dated Jan. 13, 2015.

The University Court of The University of St Andrews, UK Patent Application No. GB1413500.8, Search Report under Section 17(5), dated Jan. 14, 2015.

The University Court of The University of St Andrews, Japanese Patent Application No. 2017-505104, Office Action, dated Sep. 10, 2019.

* cited by examiner

AIRY BEAM LIGHT SHEET AND AIRY BEAM LIGHT SHEET MICROSCOPE

CROSS-REFERENCE TO RELATED APPLICATION(S)

This application is a divisional application of and claims priority to U.S. patent application Ser. No. 15/326,073, filed Jan. 13, 2017 of the same title, which, in turn, is a national stage application (filed under 35 § U.S.C. 371) of and claims priority to PCT/GB2015/052186, filed Jul. 29, 2015 of the same title, which, in turn claims priority to Great Britain Application No. 1413500.8, filed Jul. 30, 2014; the contents of each of which are hereby incorporated by reference.

FIELD OF THE INVENTION

The present invention relates to light sheet imaging and in particular a light sheet microscope.

BACKGROUND OF THE INVENTION

Light-sheet imaging is rapidly gaining importance for imaging intact biological specimens. Many of the latest innovations rely on the propagation-invariant Bessel or Airy beams to form an extended light sheet to provide high resolution across a large field of view. Shaping light to realize propagation-invariant beams often relies on complex programming of spatial light modulators or specialized, custom made, optical elements.

Light sheet fluorescence microscopy (LSFM) is becoming increasingly important in biological research, in particular for monitoring the development of large three-dimensional samples. Light-sheet microscopy provides high contrast volumetric imaging with minimal sample exposure. The axial resolution of the image is determined by the width of the illuminating light beam. In LSFM, only a thin layer of the sample is illuminated at a time and the images are captured perpendicular to the illuminated plane. Such optical sectioning ability enables high-contrast, high axial resolution, whilst minimizing sample exposure and phototoxicity.

The axial resolution of light sheet microscopy is determined by the combination of the numerical aperture of the detection objective and the thickness of the light sheet. For Gaussian-beam illumination, a large field of view requires a relatively thick light sheet, thus compromising axial resolution or exposing the sample unnecessarily to irradiation. Dual-side illumination or moving the sample along the illumination plane can extend the field of view. However, both methods increase the sample irradiation and may thus induce more photo-bleaching and photo-damage.

High axial resolution has been achieved using extended light sheets by digitally scanning a propagation-invariant Bessel or Airy beam. Airy fields can provide a wide field of view, which is ideal for light-sheet microscopy. The generation of Bessel or Airy light sheets typically require devices for digital scanning and spatial light modulation. This significantly increases the size and complexity of the optical setup. Indeed, practical applications of advanced light-sheet microscopy are often limited by the high cost and complexity of its implementation.

SUMMARY OF THE INVENTION

According to one aspect the present invention, there is provided an optical system, for example a light sheet microscope, for generating an Airy beam light sheet comprising an optical arrangement for generating a Gaussian beam, and a single optical element for converting the Gaussian beam into an Airy beam light sheet.

The optical element is preferably a static/passive optical element configured to impart a cubic phase on the Gaussian beam, thereby to convert it to an Airy beam light sheet.

The optical element preferably comprises a cylindrical lens that is tilted relative to a direction of propagation of the Gaussian beam.

A first collimator may be provided for collimating the Gaussian beam prior to incidence on the converting optical element.

A second collimator may be provided for collimating the Gaussian beam after incidence on the converting optical element.

A variable aperture/slit may be provided for varying the size of the beam incident on the converting optical element.

According to another aspect of the invention, there is provided a method for designing an Airy beam or Airy beam light sheet resulting in varying the phase and/or amplitude of the Airy beam to provide a desired intensity modulation.

The variation of the Airy beam may be considered as a multiplication of the Airy beam spectral function with a spectral modulation function. The spectral modulation function may vary the phase and/or amplitude of the Airy beam spectral function. In one example, the spectral modulation function may be arranged to modify the Airy beam spectral function in such a way as to compensate for attenuation losses due to propagation within a scattering or absorbing medium.

The method may involve varying a phase and/or amplitude of the beam to provide an intensity profile that increases along the direction of propagation. The intensity profile may be selected to compensate for attenuation losses due to propagation within a scattering or absorbing medium.

According to yet another aspect of the invention, there is provided an optical system adapted to provide a phase and/or amplitude modulated Airy beam.

The phase and/or amplitude modulated Airy beam may be represented by or a function of an Airy beam spectral function multiplied with a spectral modulation function.

The phase and/or amplitude modulated Airy beam may have an intensity profile that increases along the direction of beam propagation.

The system may include at least one dynamic diffractive optical element, such as a digital micromirror device or a spatial light modulator for generating the modulated beam. The beam may also be generated using a static diffractive optical element.

BRIEF DESCRIPTION OF THE DRAWINGS

Various aspects of the invention will be described by way of example only and with reference to the accompanying drawings, of which.

DETAILED DESCRIPTION OF THE INVENTION

Figure 1A:
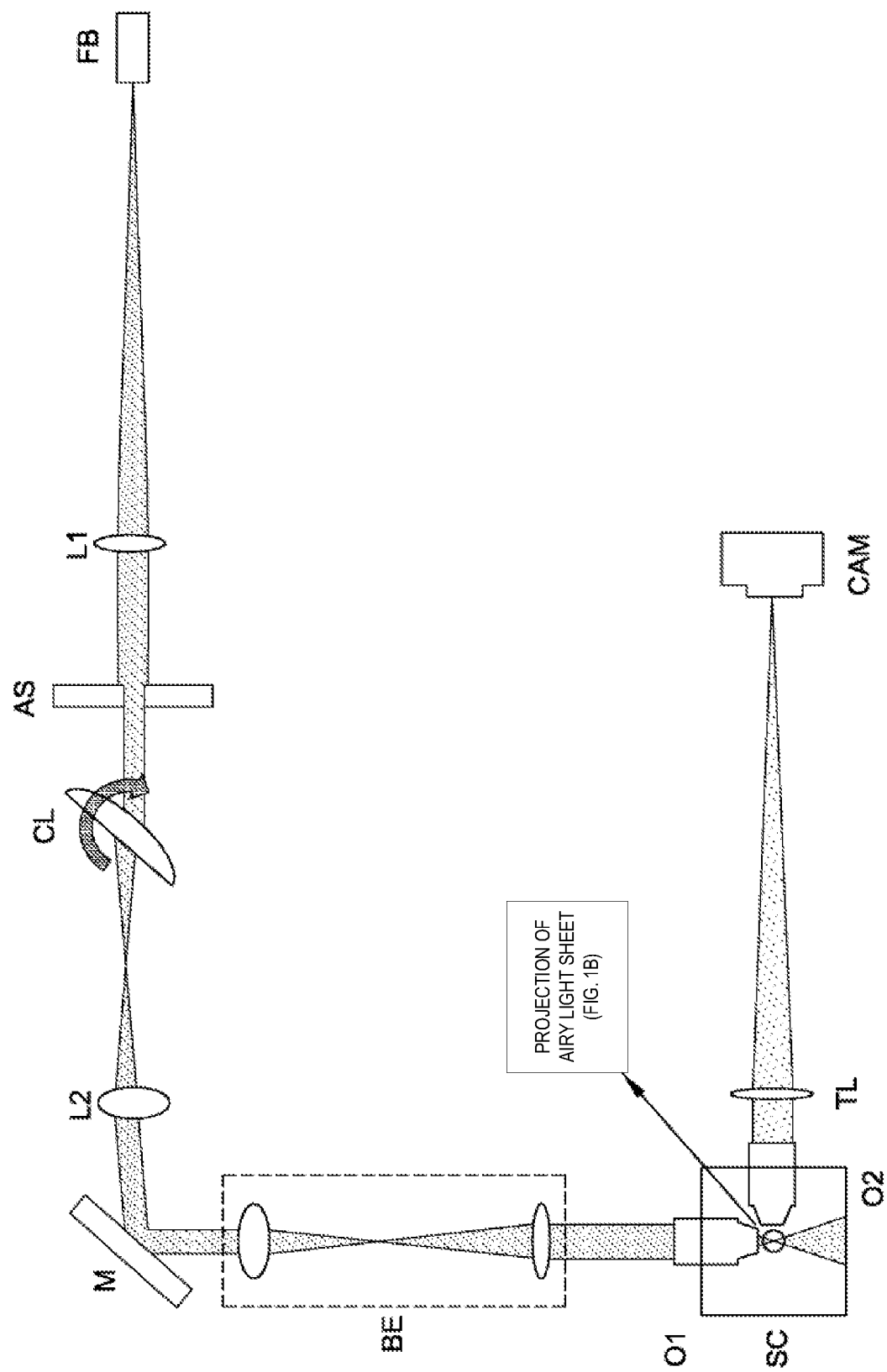
FIG. 1A shows an Airy light-sheet microscope with a tilted cylindrical lens (CL)
Figure 1B:
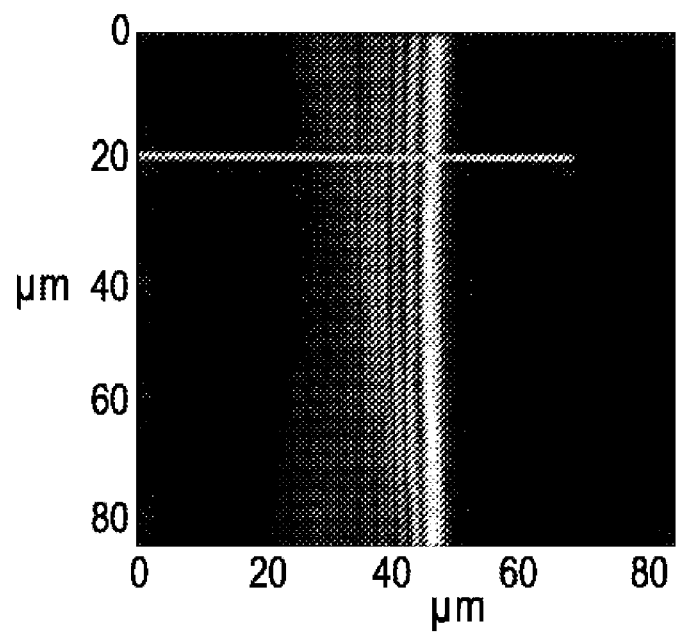
FIG. 1B is a projection of an Airy light sheet generated using the microscope of FIG. 1A.
Figure 1C:
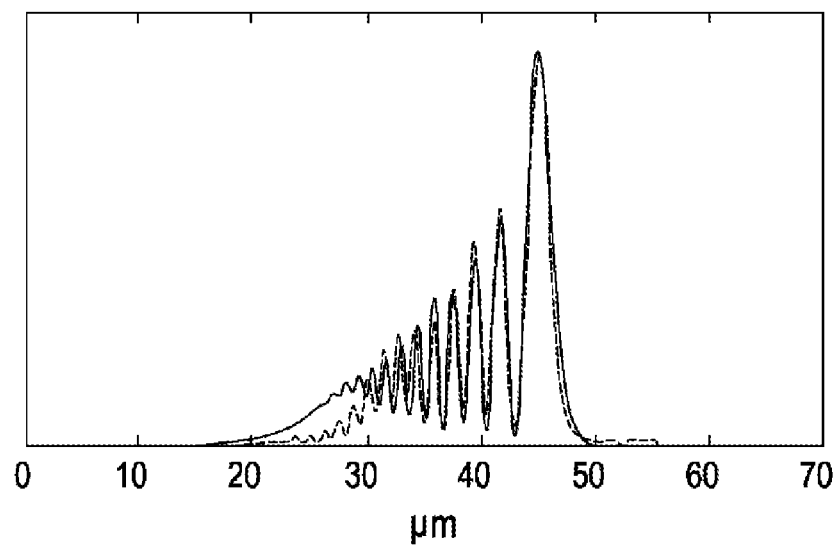
FIG. 1C is a beam profile of a cross section (red line) for FIG. 1B and the corresponding Airy beam profile from a fitted model (blue line)

FIGS. 1A, 1B, and IC show a single photon Airy beam light sheet microscope. This has a fiber FB for introducing light from a laser. The beam output from the fiber has a Gaussian profile. At an output of the fiber is a first lens L1, which collimates the beam and directs it towards an adjustable slit AS. The adjustable slit AS allows the numerical aperture of the beam to be varied. On the optical path from the adjustable slit AS is a tilted cylindrical lens, which focuses light to a focal point offset from the optical axis. Controlled tilting of the cylindrical lens about the optical axis can induce aberrations that closely approximate the cubic modulation required for Airy light sheet microscopy. Other-order aberration is compensated for using a short-focal-length lens L2, which is positioned after the focal point of the cylindrical lens to re-collimate the beam. The titled cylindrical lens results in lateral displacement of the optical axis. This displacement can be compensated for by adjusting a mirror M that is provided on the optical axis after the short-focal-length lens L2. The light sheet is imaged to the sample chamber SC by the short-focal-length lens L2, a beam expander BE and an illumination objective O1. Images are taken perpendicular to the illumination plane with a second objective O2, a tube lens TL and a camera CAM.

The microscope of FIG. 1A has been tested. For the experiments, the laser used was a Verdi V6, 6 W, 532 nm, Coherent; the lens L1 was a LA1708-A-ML, FL 200 mm, Thorlabs; the adjustable slit AS was a VA100/M, Thorlabs; the cylindrical lens was a LJ1695RM-A, FL 50 mm, Thorlabs; the short-focal-length lens L2 was a AC127-025-A-ML, FL 25 mm, Thorlabs; the first objective O1 was a UMPLFLN 10XW, 10× water dipping, NA 0.3, Olympus; the second objective O2 was a CFI Apo 40XW NIR, 40× water dipping, NA 0.8, Nikon; the tube lens TL was a LA1708-A-ML, FL 200 mm, Thorlabs, and the camera CAM was a CCD, piA640-210 gm, Basler. The whole setup fitted within a space of 35 cm*35 cm*10 cm, including the XYZ translation stage for mounting the sample. By changing the existing translation stage to a more compact automatic stage, the physical dimensions of the system can be further reduced, emphasizing its potential as a portable system.

In an initial test phase, the three-dimensional intensity distribution of the light sheet was determined. This was achieved by translating a small mirror in the sample chamber and recording the reflection plane-by-plane. Next, a model of the light sheet was fitted to the measurement. This was based on the following complex function, which represents a polynomial cubic phase modulation at the back of the aperture of the microscope objective:

$$P(u,0) = \exp(2\pi\alpha u^3), \quad (1)$$

where $P(u,0)$ is the field at the back of the aperture of the microscope objective, and $u$ is the transversal pupil coordinate normalized to the radius of the back aperture of the microscope objective. The dimensionless parameter a controls the propagation invariance of the Airy beam and the axial contrast of the image. Typical values of a are between 2 and 10, corresponding to the maximum phase modulation in units of wavelength at the edge of the aperture (see T. Vettenburg, H. I. C. Dalgarno, J. Nylk, C. C. Llado, D. E. K. Ferrier, T. Cizmar, F. J. Gunn-Moore, and K. Dholakia, "Light sheet microscopy using an Airy beam," Nat. Methods 11, 541-544 (2014), the contents of which are incorporated herein by reference).

Phase modulations up to fifth order were considered and, to account for non-uniform illumination of the back aperture, amplitude modulation up to third order polynomials. The experimentally measured light sheet deviated significantly from its theoretical prediction. The cubic modulation was found to be higher $\alpha=7.8\lambda$, while four and fifth order components were present, $1.65\lambda$ and $2.9\lambda$, respectively. Also the illumination was not uniform, with normalized linear, quadratic, and cubic components of 0.6, −0.5, and 0.4, respectively. This discrepancy with theoretical model was deemed to be due to minor misalignments in the optics. However, the fitted model allowed accurate deconvolution of the recorded data.

To assess the impact of the tilt-angle of the cylindrical lens the so-called Zemax model was used for various system parameters. A linear array of rays, uniformly spaced over a distance of 5 mm was traced through the center of the convex front surface of the tilted cylindrical lens. The optical path lengths of each ray were determined at the focal point, defined as the point where the standard deviation in optical path length is minimal. A cubic polynomial was fitted to determine a value for $\alpha$, and the residual is determined to assess the presence of higher order terms. This process was repeated for 121 cylindrical lens tilt angles between 0 and 60 degrees and for five typical excitation laser wavelengths.

Figure 2A:
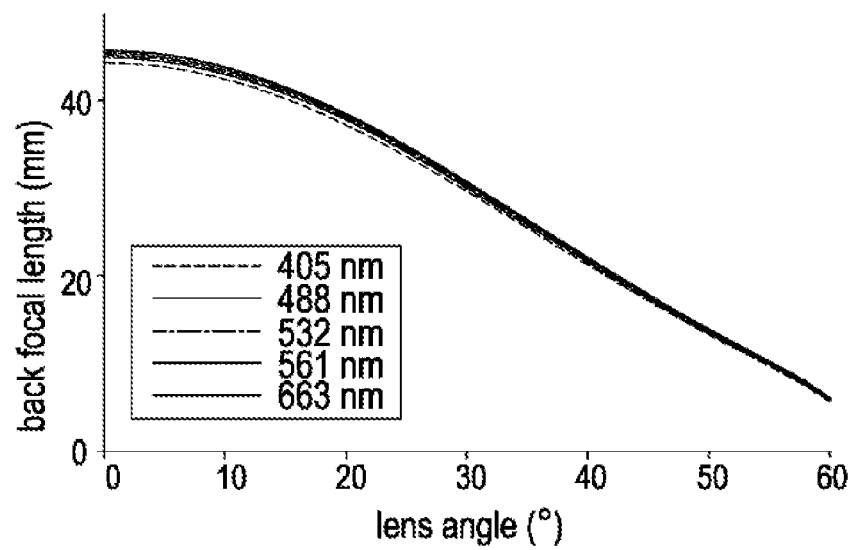
FIG. 2A shows focal length as a function of the cylindrical lens CL angle.
Figure 2B:
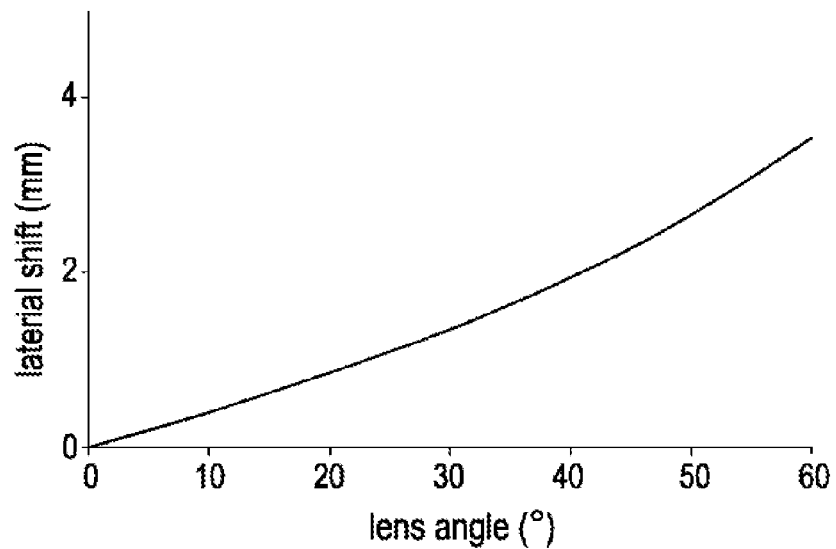
FIG. 2B shows optical axis displacement as a function of the cylindrical lens CL angle.
Figure 2C:
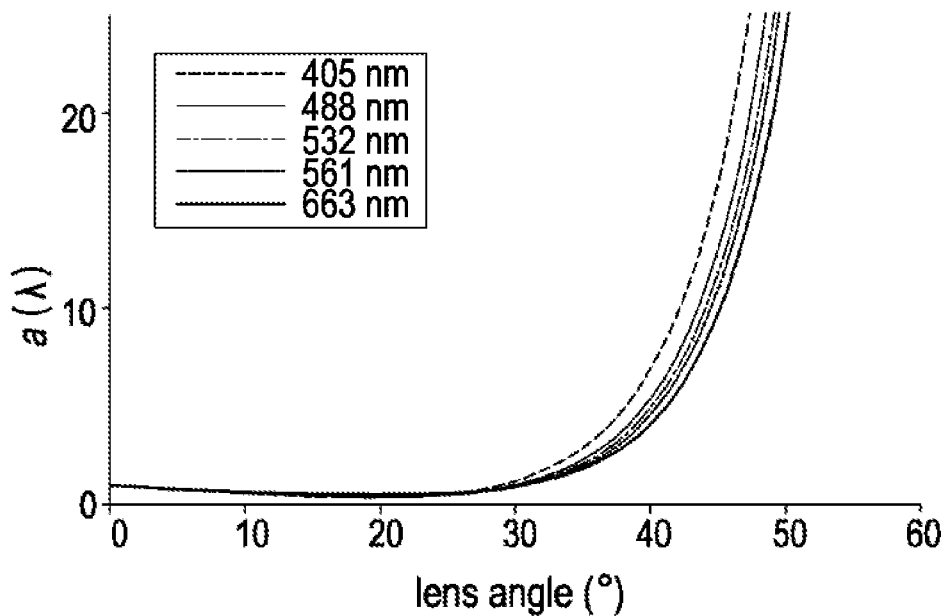
FIG. 2C shows cubic modulation residual as a function of the cylindrical lens CL angle.
Figure 2D:
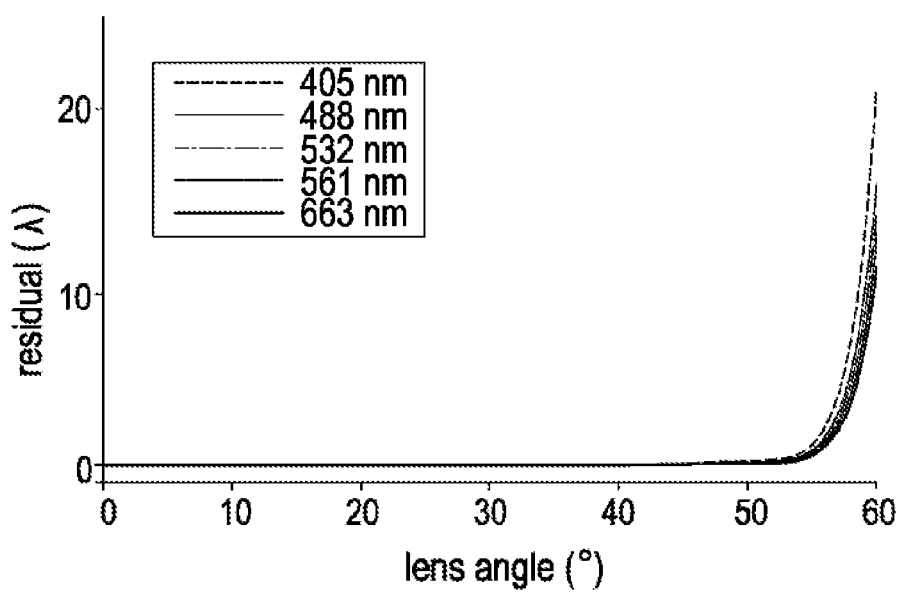
FIG. 2D shows higher order modulation residual as a function of the cylindrical lens CL angle.

FIGS. 2A, 2B, 2C, and 2D show the influence of the cylindrical lens tilt angle. In particular, FIG. 2A shows focal length, FIG. 2B shows optical axis displacement, FIG. 2C shows cubic modulation residual and FIG. 2D shows higher order modulation residual, each as a function of the lens angle. The line colors correspond to the natural wavelengths 405 nm, 488 nm, 532 nm, 561 nm, and 633 nm. At the wavelength of 532 nm used in the experiments, the a value is $1.21\lambda$ at 35 degrees, $4.13\lambda$ at 40 degrees, and $11.24\lambda$ at 45 degrees. This covers the values useful values for Airy beam light sheet microscopy. Almost no higher order terms are present as can be seen from FIG. 2D. The residual phase modulation has a standard deviation of only $0.026\lambda$, $0.006\lambda$, and $0.061\lambda$, respectively. The focal lengths are 26 mm, 22 mm, and 18 mm. The axis position shifts by 1.6 mm, 1.9 mm, and, 2.3 mm. The focus position at a wavelength of 488 nm differs by less than 1%. As a result, the optics do not need to be adjusted for minor changes in wavelength.

As can be seen from FIGS. 2A and 2B, the position of the focal point is clearly dependent on the lens angle. Adjusting the modulation will thus require readjusting the position of the cylindrical lens. However, minimal wavelength dependency is seen, even if the cylindrical lens is a singlet lens. In addition, as can be seen from FIG. 2C, the cubic modulation varies dramatically for lens angles between 0 and 60 degrees. Tilt angles between 40 degrees and 45 degrees result in cubic polynomial coefficients in the range typically required for Airy light sheet microscopy. The residual modulation is calculated as the root-mean-square optical path difference after subtracting the cubic term. This increases rapidly for angles close to 60 degrees. However, between 40 degrees and 45 degrees it is negligible ($<\lambda/10$, FIG. 2D). In this range, the focal position varies only by a few millimeters, as can be seen from FIGS. 2A and 2B.

The system was tested by recording three-dimensional data-stacks of red fluorescent microspheres (R600, Thermo Scientific, 600 nm) embedded in 1.5% agarose and suspended in the water immersed sample chamber from the top. For these experiments, the excitation wavelength was 532 nm and the tilt angle was set at 40 degrees. This should provide a theoretical cubic modulation of approximately $\alpha=4.13\lambda$. The suspended sample was scanned using a motorized actuator (CMA-25CCCL, Newport) on a XYZ linear stage (M-562-XYZ, Newport) and images were acquired every 185 nm.

Figure 3A:
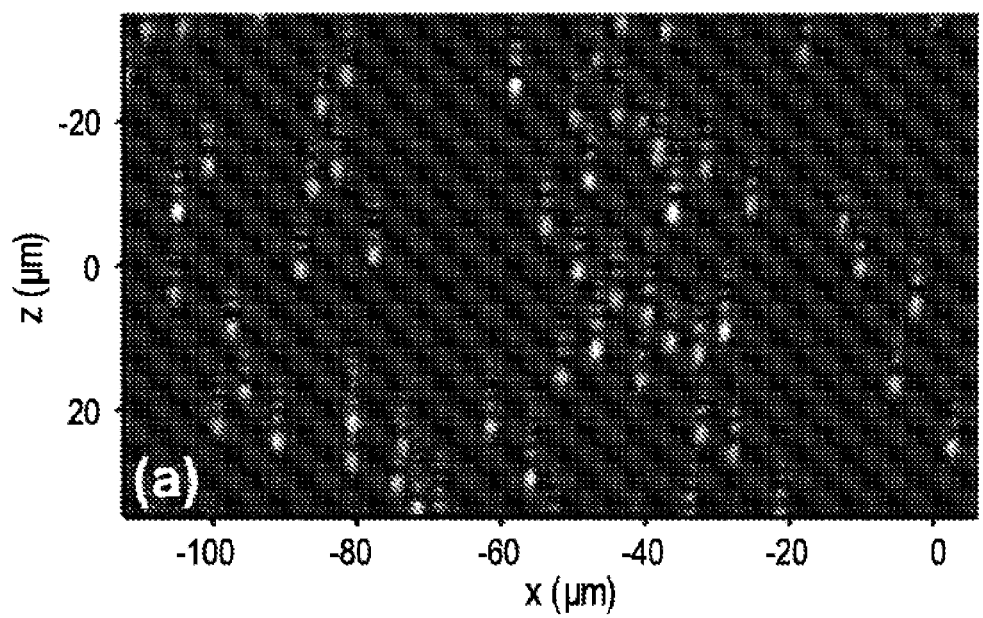
FIG. 3A shows a vertical projection of a sample with fluorescent microspheres before deconvolution.

FIG. 3A shows a vertical projection of the sample before deconvolution. The vertical projection in FIG. 3A clearly shows how the asymmetric transversal structure of the Airy light sheet interacts with each microsphere to create an axially elongated tail. Although before deconvolution the fluorescent microspheres appear blurred in the axial dimension, z, the pattern is relatively independent of the horizontal coordinate, x. For this experiment, the numerical aperture of the detection objective was reduced using an iris to accurately capture this pattern. Care was taken to align the stage movement with the optical axis of the detection objective. However, a small deviation was still detected in the elongated tails. The residual error was found to be consistent. Hence, it could be corrected by digitally warping the recorded data by a small amount before applying the deconvolution.

Figure 3B:
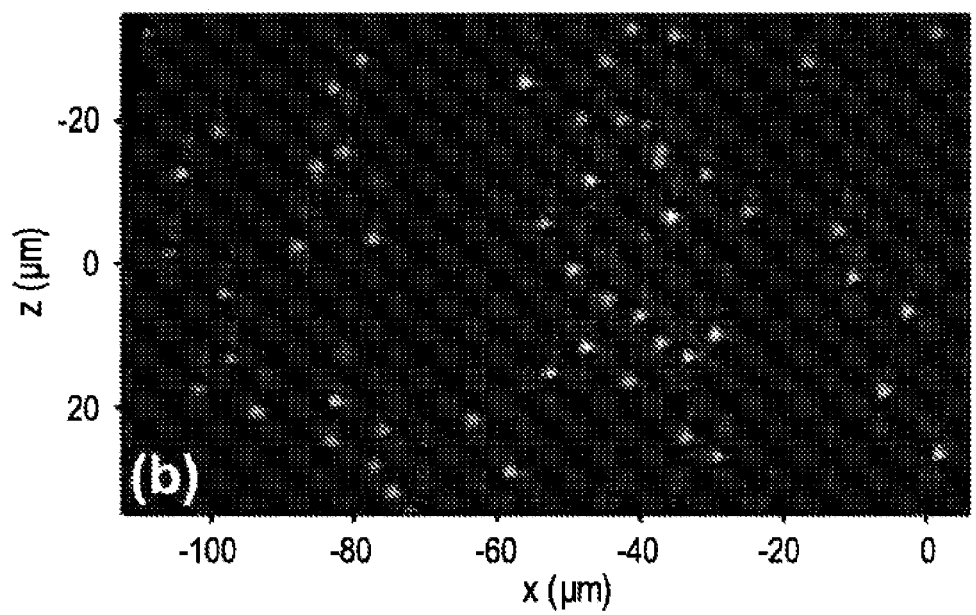
FIG. 3B shows a vertical projection of a sample with fluorescent microspheres after deconvolution.

FIG. 3B shows a vertical projection of the sample after deconvolution. This shows that the axial resolution is comparable across the entire field-of-view of the camera chip. A Gaussian light sheet with equivalent NA would provide axial resolution of 1.4 µm and only remain confined in the Rayleigh interval −4 µm<x<4 µm, although accurate deconvolution may be possible over a larger FOV. In contrast, the Airy light sheet illumination gives access to areas that are at least four times more distant from the light sheet waist, essentially enabling high axial resolution across the sensor area.

Figure 4:
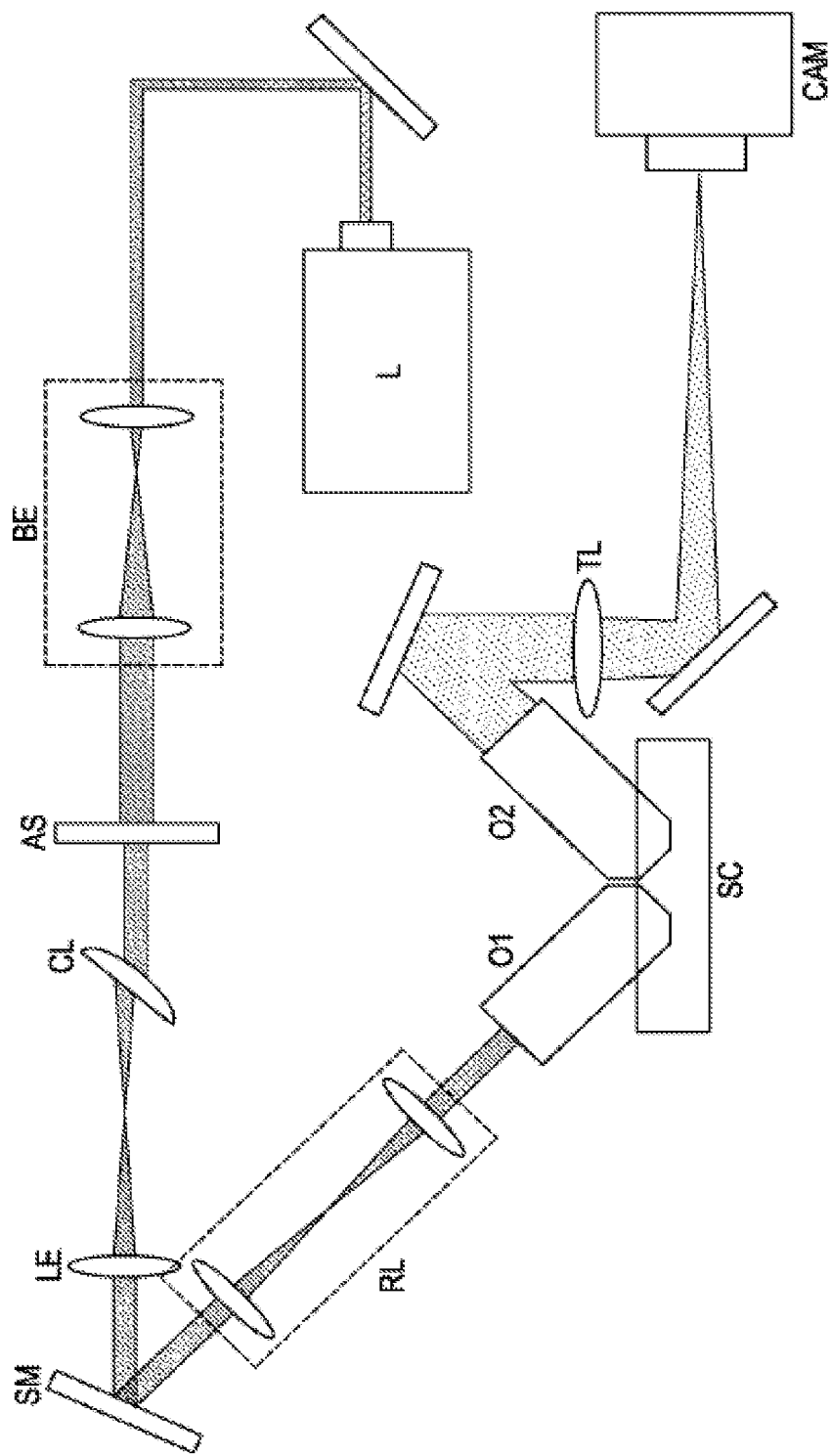
FIG. 4 shows another Airy light-sheet microscope with a tilted cylindrical lens (CL)

FIG. 4 shows another compact Airy-beam light-sheet microscope. In this case, the optical arrangement and its functionality is generally the same as for FIG. 1A, except that in this case the illumination objective O1 and the imaging objective O2 are positioned vertically above the sample chamber SC. As shown, the illumination objective O1 and the imaging objective O2 are symmetrically positioned relative to the sample chamber and at 45 degrees to the horizontal.

The present invention provides a low-cost compact Airy-beam light-sheet microscope. The entire optical setup can be arranged to fit well within a small footprint, for example of 35 cm*35 cm*10 cm. The compactness and portability of the system makes it more accessible to biologists. Simulations showed that tilting the cylindrical lens allows a controllable amount of cubic phase modulation to generate the Airy light sheet, while the additional tilt and defocus can be readily compensated for by appropriate use of relay optics. Experiments show that the axial resolution is comparable to that expected from a Gaussian light sheet, yet across the full FOV of the detector area.

Using an Airy beam for light sheet imaging has a number of advantages due to the self-healing, non-linear, and non-diffractive propagation nature of the Airy beam. However, these properties are only maintained in isotropic lossless media. Propagation through absorbing or scattering media leads to an exponential intensity decay in the propagation direction of the beam. To counteract this behavior the Airy beam can be modified to compensate, over a finite distance, for this effect. By applying the duality between the equations that describe the paraxial diffraction of spatially confined light beams and the dispersion of narrow-band pulses in dielectrics (so called, space-time duality), an equivalent compensating Airy beam is provided for spatial optics.

The theoretical basis of the attenuation compensating Airy beam and its propagation properties will now be described. The one dimensional Airy beam field, in the apex plane, is defined by $$u_o(x) = Ai\left(\frac{x}{x_o}\right)$$

where x is the transversal coordinate and $x_0$ its scaling factor. The associated Fourier transform, in the reciprocal space defined by $k_x$.

$$\hat{u}_0(k_x) = x_0 \exp\left(\frac{ix_0^3 k_x^3}{3}\right)$$

shows the characteristic cubic phase profile and defines the spatial spectrum of the Airy beam. The attenuation compensating Airy beam is created through a variable amplification factor of each spectral component defined by $\exp(-b_0 k_x)$.

Using the Huygens-Fresnel integral in the reciprocal space, the beam spatial spectrum can be determined after propagating a distance z through a linearly absorbing media:

$$\hat{u}(k_x, z) = \exp\left(\frac{ik_x^2 z}{2k} - ikz\right)\hat{u}_0(k_x)\exp(-b_0 k_x)$$

where $$k = n_0 k_0 - \frac{i\alpha}{2}$$

is the complex wave-vector defined to include the vacuum wave-vector $k_0 = 2\pi/\lambda$ and index of refraction $n_0$ and absorption coefficient $\alpha$ of the medium. Considering a bandwidth limited Airy beam $|k| \le k_{max}$ and distances of propagation $z \ll 4n_0^2 k_0^2/(\alpha k_{max}^2)$ the propagation evolution can be approximated to:

$$\hat{u}(k_x, z) \approx \exp\left(\frac{ik_x^2 z}{2n_0 k_0} - ikz\right)\hat{u}_0(k_x)\exp(-b_0 k_x).$$

By performing an inverse Fourier transform of this spatial spectrum, the beam field associated with the compensated beam at any propagation position x can be determined:

$$u(x, z) = Ai\left(\frac{x}{x_0} - \frac{z^2}{4z_0^2} + \frac{ib_0}{x_0}\right)\exp\left(-\frac{\alpha z}{2} + \frac{zb_0}{2z_0 x_0}\right)\exp\left(\frac{iz^3}{12z_0^3} - \frac{iz_0 z}{x_0^2} - \frac{izx}{2z_0 x_0}\right)$$

where $z_0 = n_0 k_0 x_0^2$ is associated to the opening parameter of the parabolic trajectory of the Airy beam.

Figure 5A:
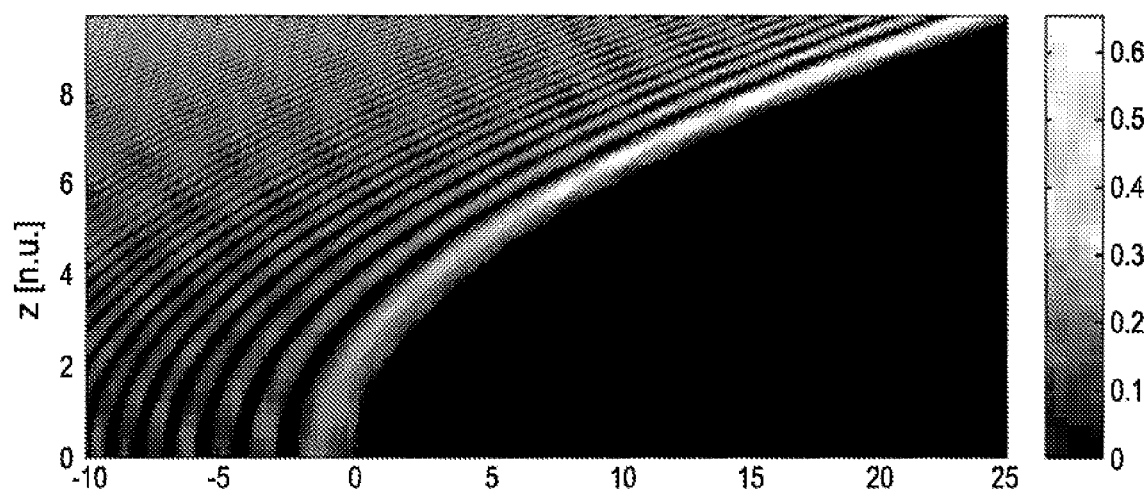
FIG. 5A shows an x-z intensity density plot for an intensity profile of an attenuation compensating Airy beam as it propagates through a lossy medium with x0=1, z0=1, α=0 and b0=0:2.
Figure 5B:
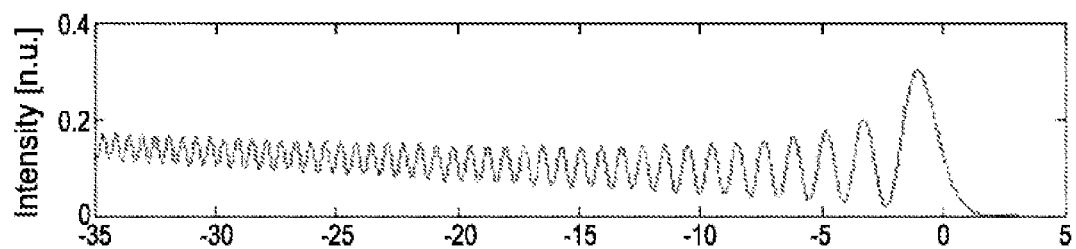
FIG. 5B shows a cross section in the apex plane z=0 for an intensity profile of an attenuation compensating Airy beam as it propagates through a lossy medium x0=1, z0=1, α=0 and b0=0:2.

It is the $zb_0/(2z_0 x_0)$ term that counteracts the exponential field decay in a linearly absorbing medium. Indeed, the overall compensated intensity loss is given by $\alpha - b_0/(z_0 x_0)$. FIGS. 5A and 5B show the cross section of this beam and its propagation behavior through a non-absorbing medium. In particular, FIGS. 5A and 5B show an intensity profile of the attenuation compensating Airy beam as it propagates through a lossy medium with x0=1, z0=1, $\alpha$=0 and b0=0:2. (FIG. 5A) x-z intensity density plot (FIG. 5B) cross section in the apex plane z=0.

The beam can be understood by considering an exponential amplification in reciprocal space. This amplification counteracts the intensity loss due to linear absorption when viewing the Airy beam as the superposition of multiple plane waves forming a caustic corresponding to the main lobe of the Airy beam. The exponential amplification increases in effect the amplitude of the constituent plane waves such that taking into account the absorption, these plane waves "reach" the main lobe having the same amplitude.

The two dimensional Airy beam can be treated in a similar way and corresponds to the product between two complex fields u(z,x)u(z,y)exp (ikz) where the last term cancels out the double counted carrier wave. In this case, the attenuation compensated Airy beam has a compensated loss term defined $\gamma = \alpha - (b_{0x} + b_{0y})/(z_0 x_0)$ where $b_{0x}$ and $b_{0y}$ correspond to the compensation factors for the u(z,x) and u(y,z) fields. The attenuation compensation behavior is also possible for finite energy Airy beams.

In order to demonstrate the diffraction-free propagation and simultaneous attenuation compensation of the finite energy Airy-based beam, three attenuation compensated Airy beam examples were investigated. The laser source used was a Helium-Neon laser $\lambda$=543 nm). A digital micromirror device DMD was used in this instance for the complex field (amplitude/phase) spatial light modulation needed to generate the Airy beam. A digital micromirror device DMD has an array of microscopic mirrors that can be individually rotated in two positions, each of them leading to an on/off modulation of the reflected output beam at that specific pixel. This results in a binary amplitude spatial light modulation of an incident light beam according to the micromirrors states. For the experiment, the digital micromirror device used was a Texas Instruments DLP Lightcrafter EVM.

Two propagation media were considered: one lossless reference media corresponding to propagation through air and one lossy propagation media consisting of a Rhodamine-B solution in water, with a measured absorption, due to fluorescence, of $\alpha=2.97$ dB/cm. The parameters used were $x_0=2.78\times10^{-5}$ m and $b_{0x}=b_{0y}=q\cdot1.84\times10^{-6}$ m, where $q=0$, 1, and 2, respectively for first, second and third beam examples (note that the first example corresponds to a "classic" Airy beam). These values lead to an overall intensity loss factors $\gamma=2.97-q\cdot0.97$ dB/cm in the Rhodamine-B solution in water (with $n_0=1.33$). In air (with $n_0=1$, and $\alpha=0$), the value obtained was $\gamma=-q\cdot1.20$ dB/cm. A finite energy beam is obtained by windowing in spectral domain, applying an 8th-order super-Gaussian flat-top window:

$$W(k_x,k_y)=\exp(-k_x^8/(2k_{max}^8))\exp(-k_y^8/(2k_{max}^8))$$

where $k_{max}=1.77\times10^4$ m$^{-1}$.

The desired beam function was designed to be focused at a central position 12 cm after the DMD surface by pre-compensating the diffraction corresponding to 12 cm of free-space propagation. By using an approximately uniform illumination on the DMD modulation area, the desired spatial modulation functions can be considered to be approximately equal to the previously designed beam complex field functions. Moreover, it is possible to codify a complex (amplitude/phase) spatial modulation $\psi(x,y)\in\mathbb{C}$ in the binary amplitude spatial modulation delivered by the DMD. Here, a two-step encoding procedure is considered. In a first step, a real non-negative diffraction mask $f(x,y)$ associated with the complex modulation $\psi(x,y)$ is created by using $$f(x,y) = f_0(x,y) + f_{+1}(x,y) + f_{-1}(x,y) == |\psi(x,y)| + \mathrm{Re}(\psi(x,y)e^{i(k_x x+k_y y)})$$

where the diffraction mask leads to three diffraction orders $f_0(x,y)=|\psi(x,y)|$, $$f_{+1}(x,y) = \frac{1}{2}\psi(x,y)e^{i(k_x x+k_y y)}, f_{-1}(x,y) = \frac{1}{2}\psi^*(x,y)e^{i(-k_x x-k_y y)},$$

each of them generating a modulated beam in an angle defined by the mask wavevector $(k_x,k_y)$. A pinhole selection of the diffraction order $f_{+1}(x,y)$ provides a desired complex modulation $\psi(x,y)$.

Finally, the real non-negative modulating function $f(x,y)$ can be quantized resulting in a binary amplitude modulating function, by applying a binary dithering algorithm. More specifically, a Floyd-Steinberg error-diffusion dithering algorithm is used here, where the resulting binary distribution is calculated by diffusing the residual quantization error of a quantized pixel onto its neighbouring pixels.

Figure 6A:
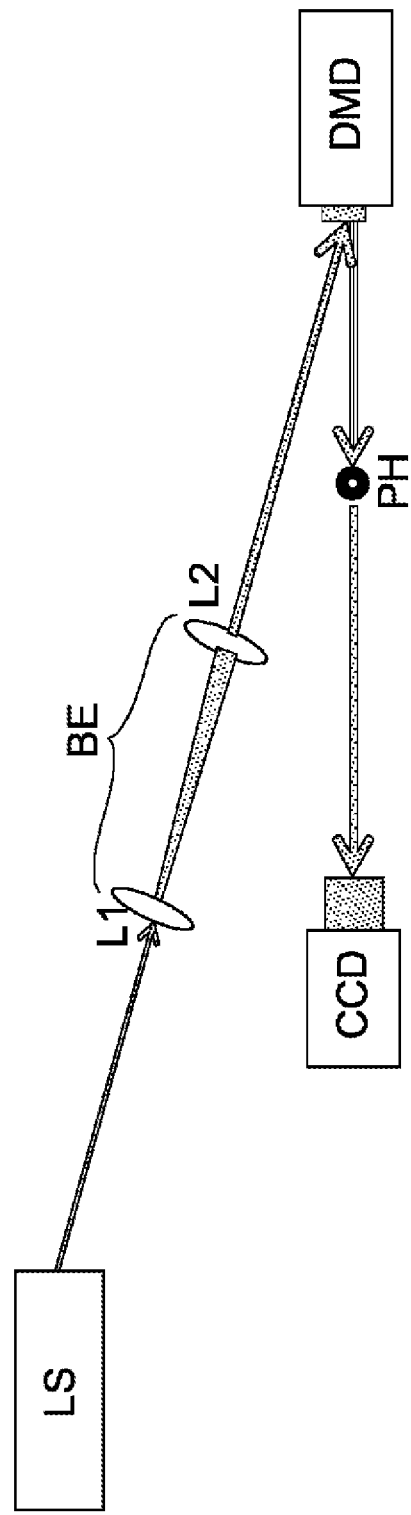
FIG. 6A is a schematic representation of an experimental set up for lossless (air) Airy beam propagation experiments.
Figure 7A:
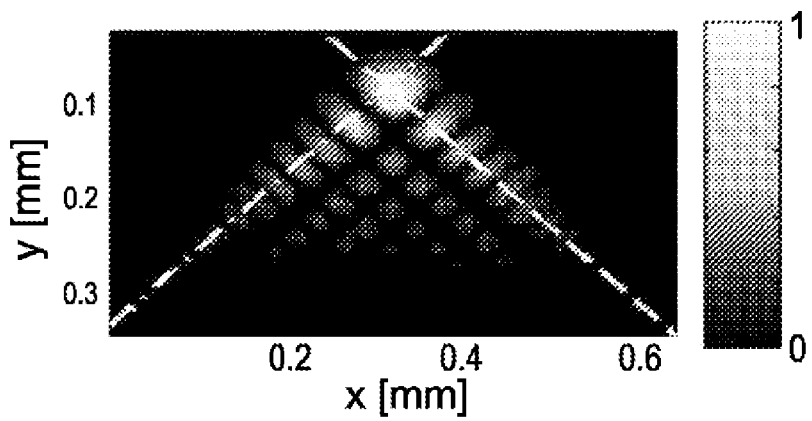
FIG. 7A shows a plot of beam intensity function after 11 cm of lossless propagation for a first example, where beam axes '1' and '2' are showed in white dotted and dash-dotted line, respectively.
Figure 7B:
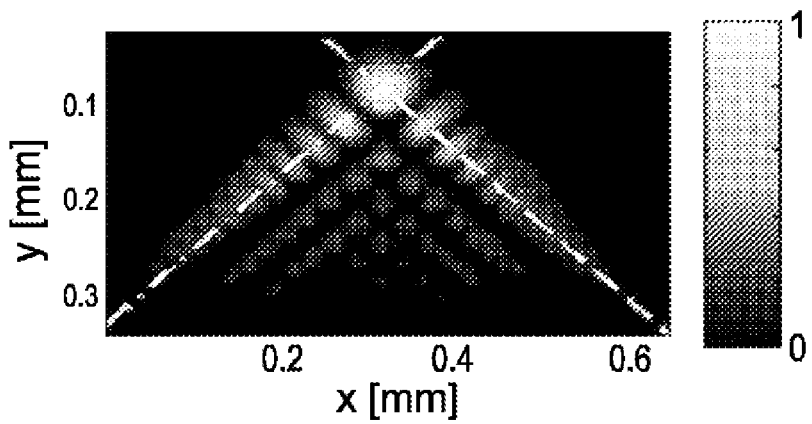
FIG. 7B shows a plot of beam intensity function after 11 cm of lossless propagation for a second example, where beam axes '1' and '2' are showed in white dotted and dash-dotted line, respectively.
Figure 7C:
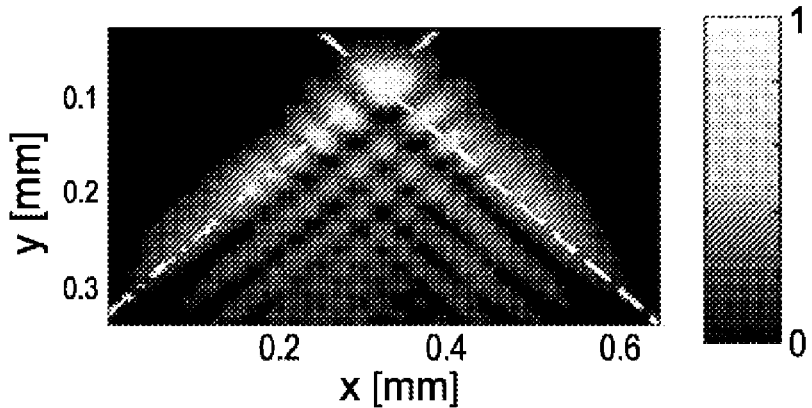
FIG. 7C shows a plot of beam intensity function after 11 cm of lossless propagation for a third example, where beam axes '1' and '2' are showed in white dotted and dash-dotted line, respectively.
Figure 7D:
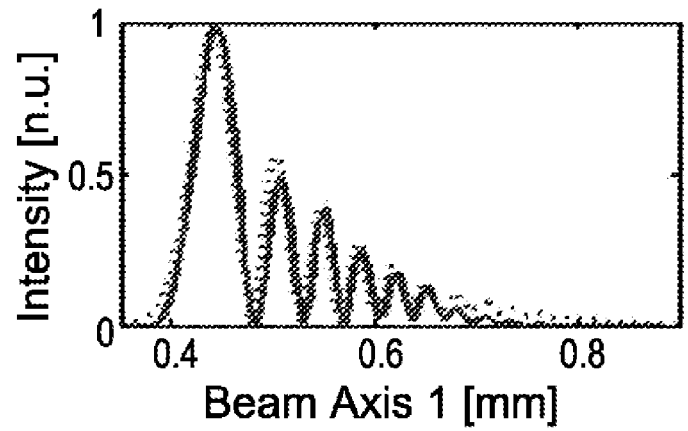
FIG. 7D shows measured (solid) and numerically simulated (dashed) beam intensity across beam axes '1' for the first beam example.
Figure 7E:
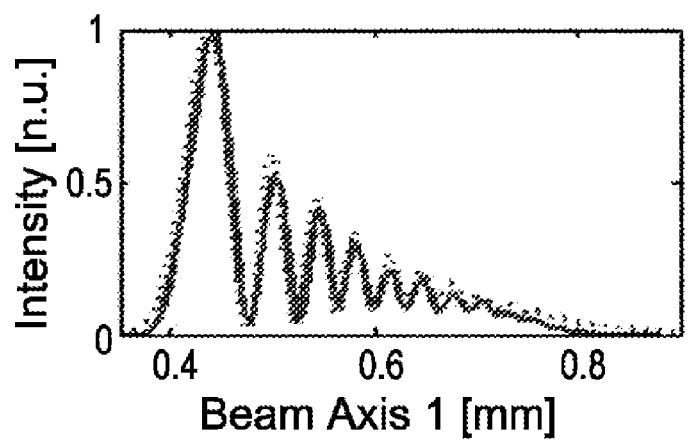
FIG. 7E shows measured (solid) and numerically simulated (dashed) beam intensity across beam axes '1' for the second beam example.
Figure 7F:
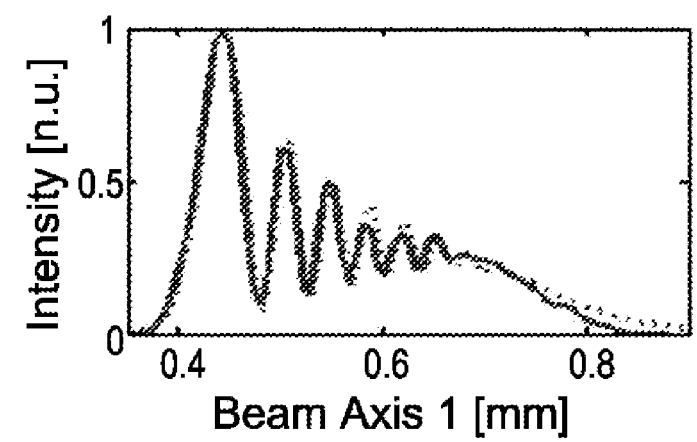
FIG. 7F shows measured (solid) and numerically simulated (dashed) beam intensity across beam axes '1' for the third beam example.
Figure 7G:
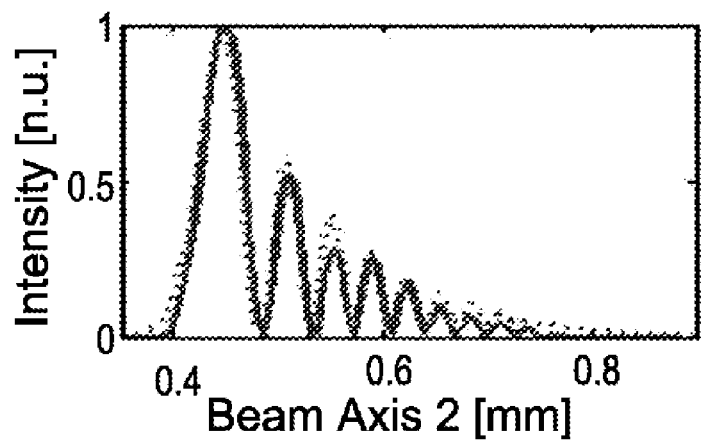
FIG. 7G shows measured (solid) and numerically simulated (dashed) beam intensity across beam axes '2' for the first beam example.
Figure 7H:
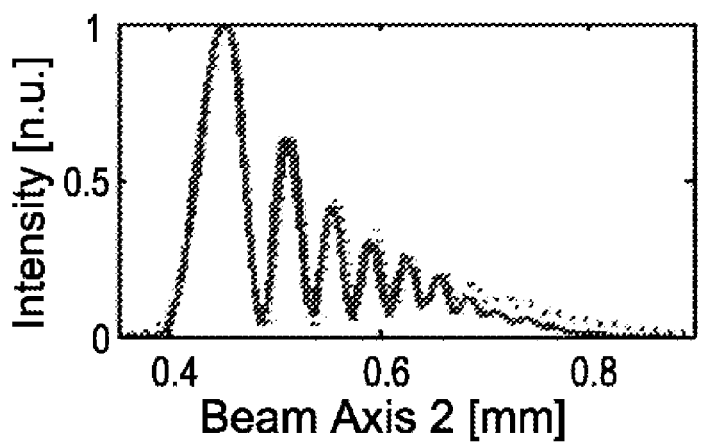
FIG. 7H shows measured (solid) and numerically simulated (dashed) beam intensity across beam axes '2' for the second beam example.
Figure 7I:
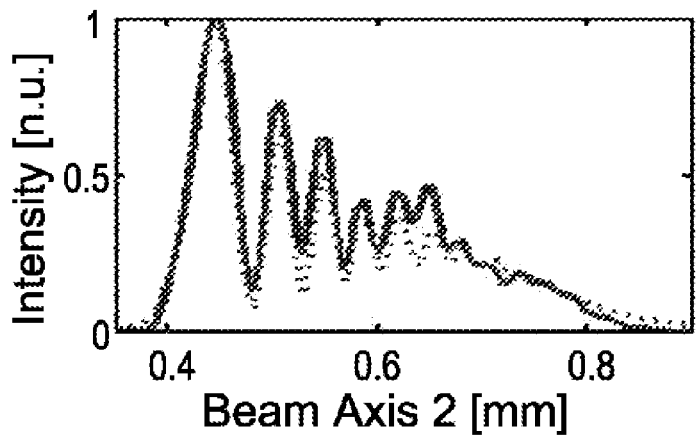
FIG. 7I shows measured (solid) and numerically simulated (dashed) beam intensity across beam axes '2' for the third beam example.

FIG. 6A shows an experimental set up for testing for free-space propagation. An expanded and collimated beam from the laser source is modulated by a DMD with the previously calculated binary spatial modulating functions. FIGS. 7A-7C show the resulting beam captured by the CCD at 11 cm from the DMD modulating surface, where the beam profile across the Airy beam axes is represented, and compared to those predicted by numerical simulations. The resulting propagating beams are captured by a CCD camera at different distances. In particular, FIGS. 7A-7C show plots of beam intensity after 11 cm of lossless propagation for first, second and third examples, where beam axes '1' and '2' are shown in white dotted and dash-dotted lines, respectively. FIGS. 7D-7F show measured (solid) and numerically simulated (dashed) beam intensity across beam axes '1' for the first, second and third beam examples, respectively. FIGS. 7G-7I show measured (solid) and numerically simulated (dashed) beam intensity across beam axes '2' for the first, second and third beam examples, respectively.

Figure 8A:
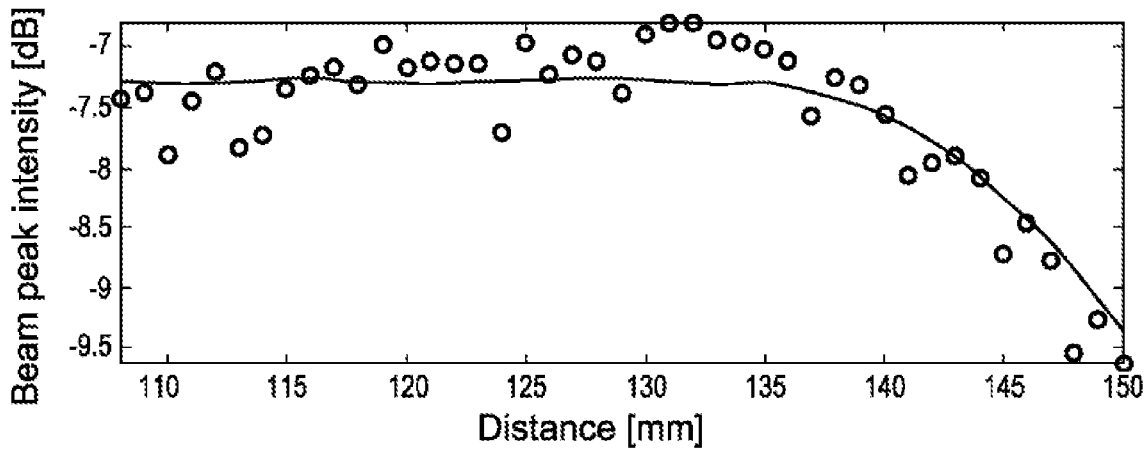
FIG. 8A shows beam peak intensity during the lossless propagation from numerical simulation (solid) and experimental measurements (circle-dashed) for the first beam example, designed to exhibit an exponential growth of 0 dB/cm.
Figure 8B:
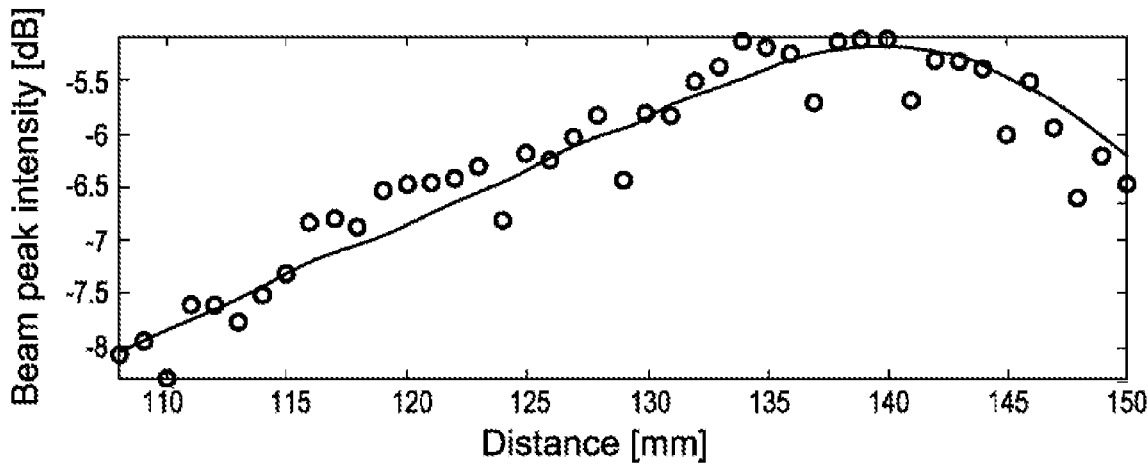
FIG. 8B shows beam peak intensity during the lossless propagation from numerical simulation (solid) and experimental measurements (circle-dashed) for the second beam example, designed to exhibit an exponential growth of 1.29 dB/cm.
Figure 8C:
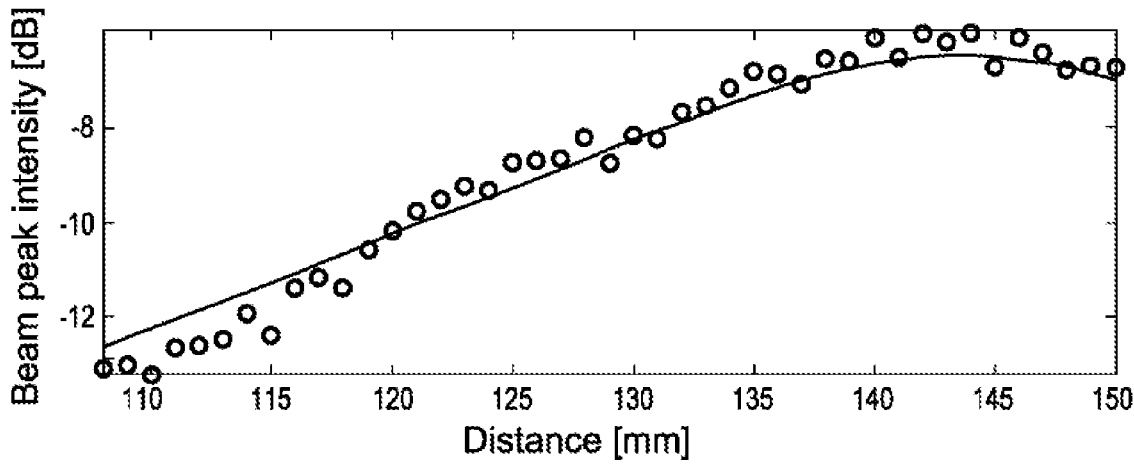
FIG. 8C shows beam peak intensity during the lossless propagation from numerical simulation (solid) and experimental measurements (circle-dashed) for the third beam example, designed to exhibit an exponential growth of 2.48 dB/cm.

FIGS. 8A-8C show beam peak intensity during the lossless propagation from numerical simulation (solid) and experimental measurements (circle-dashed) for first (FIG. 8A), second (FIG. 8B), and third (FIG. 8C) beam examples, designed to exhibit an exponential growth of 0, 1.29 and 2.48 dB/cm, respectively. In these examples, the theoretically predicted positive linear logarithmic (i.e. increasing exponentially) evolution of the beam maximum along the propagation path is obtained.

Figure 6B:
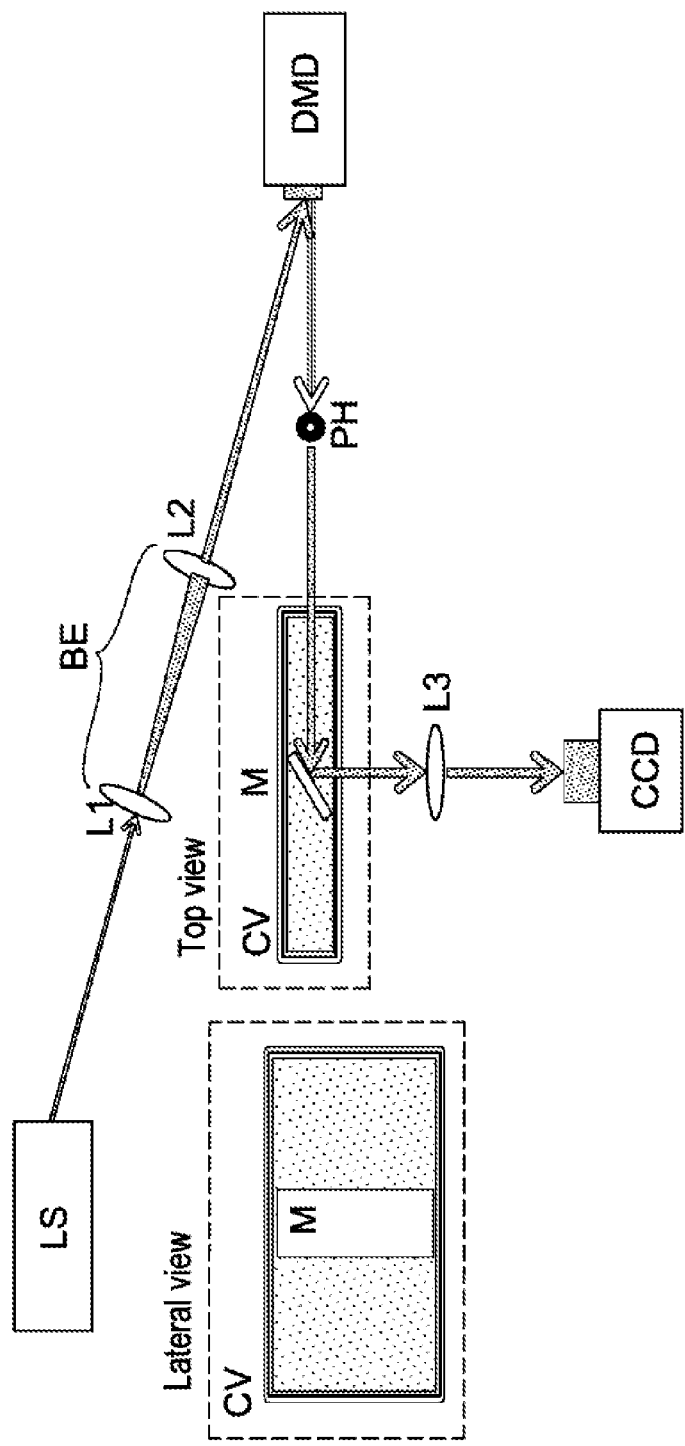
FIG. 6B is a schematic representation of an experimental set up for absorptive/lossy (Rhodamine-B solution) Airy beam propagation experiments.

FIG. 6B shows an experimental set up for demonstrating the compensating effect of the modified Airy beam. Here, a cuvette (5 cm long (in the propagation direction z), 1 cm wide and 12.5 cm high) is filled with the solution of Rhodamine-B in water. In order to measure the beam peak intensity inside the cuvette, a customized size square gold mirror was fabricated to fit inside the cuvette. The reflected beam is captured by a CCD camera focused at the reflection point.

Figure 9A:
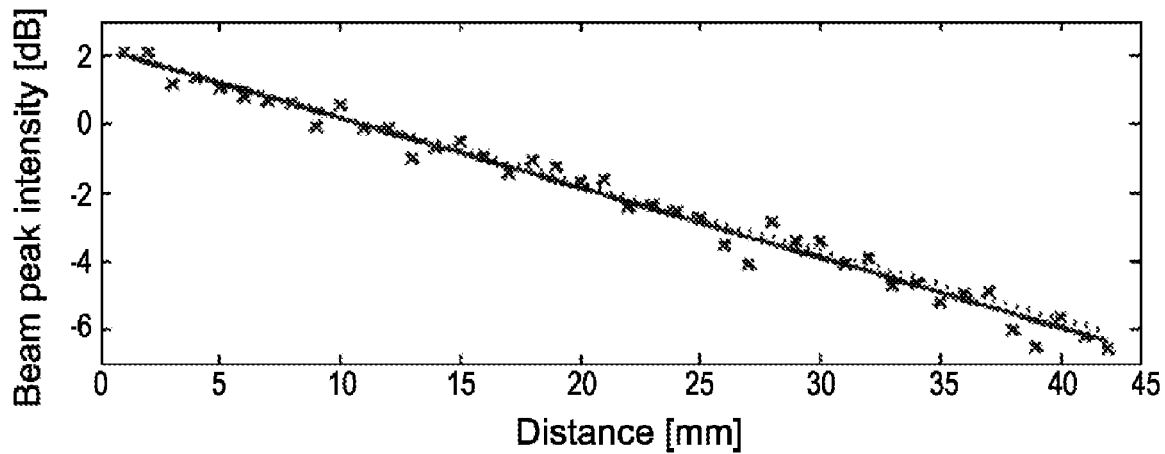
FIG. 9A shows peak intensity along a path of lossy medium propagation inside the cuvette containing the Rodhamine-b water solution, obtained from experimental measurements (crosses), and linear fit (solid), compared to a theoretically expected peak intensity evolution (dashed) for the first beam example.
Figure 9B:
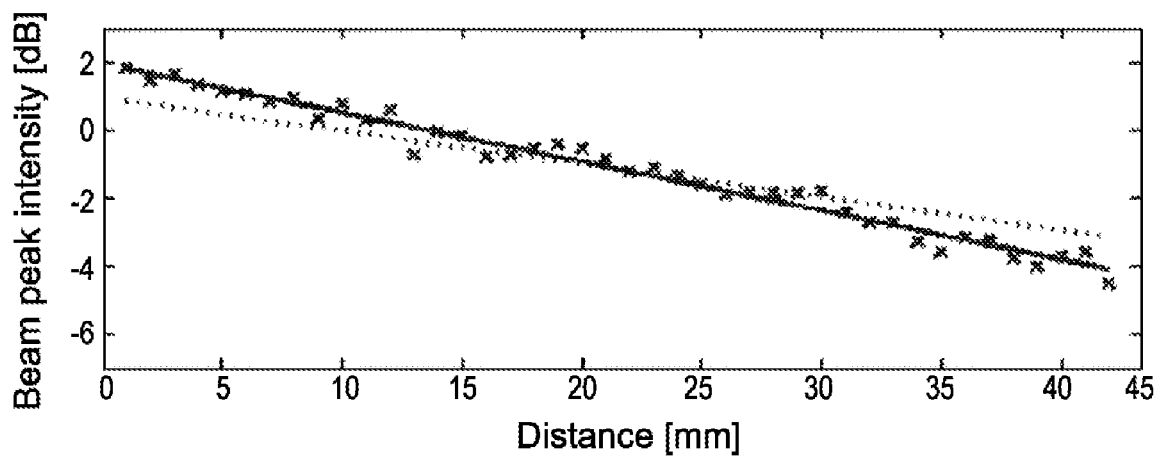
FIG. 9B shows peak intensity along a path of lossy medium propagation inside the cuvette containing the Rodhamine-b water solution, obtained from experimental measurements (crosses), and linear fit (solid), compared to a theoretically expected peak intensity evolution (dashed) for the second beam example.
Figure 9C:
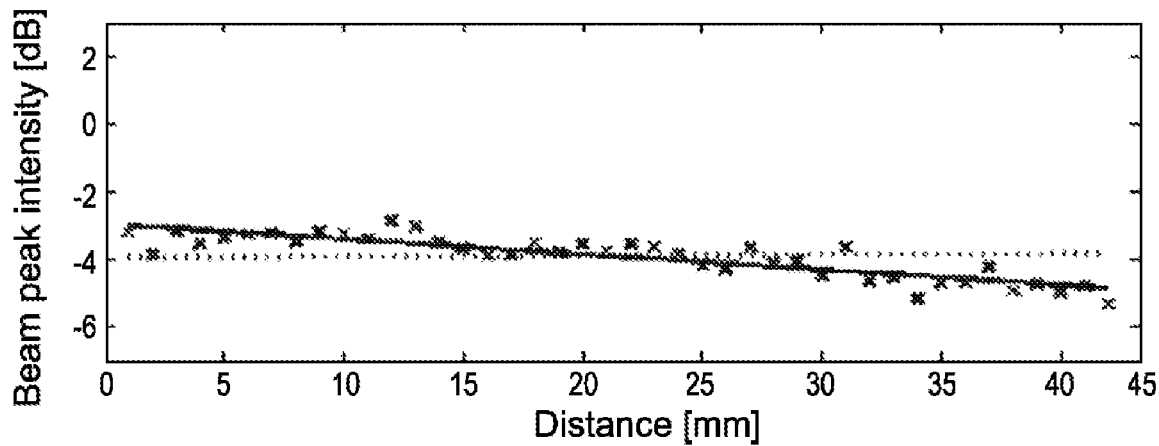
FIG. 9C shows peak intensity along a path of lossy medium propagation inside the cuvette containing the Rodhamine-b water solution, obtained from experimental measurements (crosses), and linear fit (solid), compared to a theoretically expected peak intensity evolution (dashed) for the third beam example.
Figure 10B:
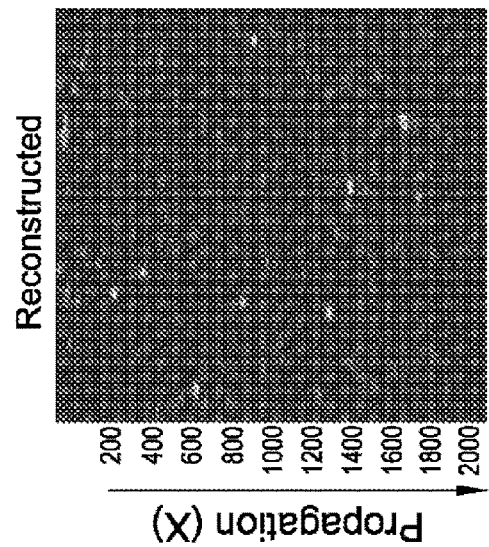
FIG. 10B shows a reconstructed image from a light sheet microscope for uncompensated light sheets.
Figure 10D:
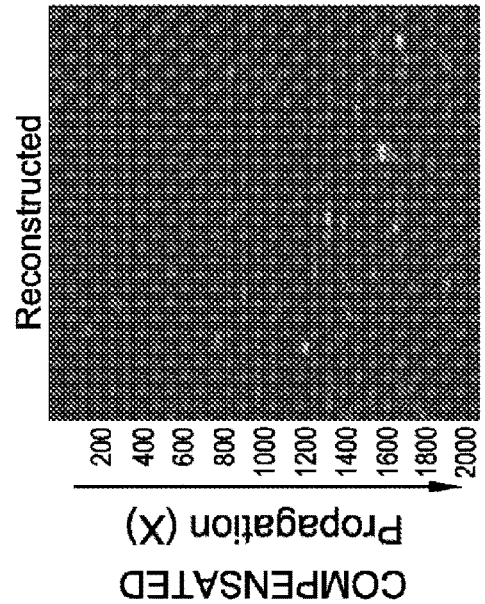
FIG. 10D shows a reconstructed image from a light sheet microscope for compensated light sheets.
Figure 10A:
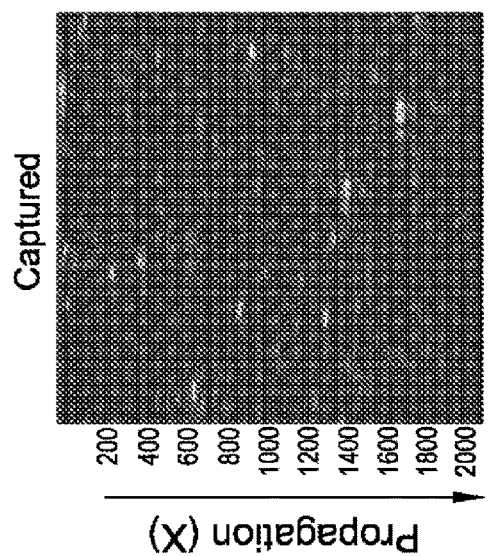
FIG. 10A shows a captured image from a light sheet microscope for uncompensated light sheets.
Figure 10C:
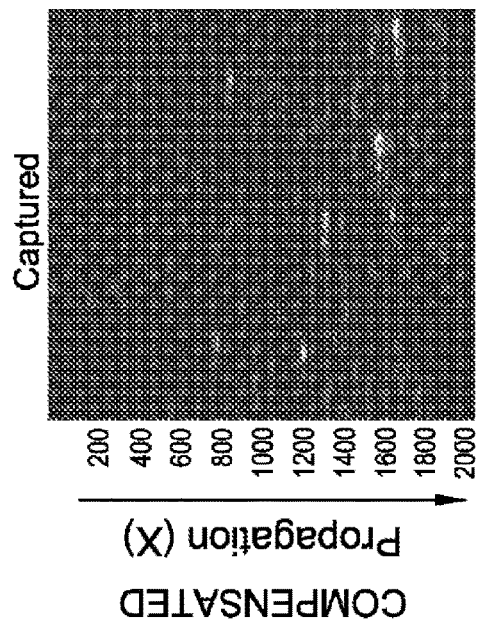
FIG. 10C shows a captured image from a light sheet microscope for compensated light sheets.

FIGS. 9A-9C show shows peak intensity along the path of lossy medium propagation inside the cuvette containing the Rodhamine-b water solution, obtained from experimental measurements (crosses), and linear fit (solid), compared to the theoretically expected peak intensity evolution (dashed) for the first (FIG. 9A), second (FIG. 9B), and third (FIG. 9C) beam examples, respectively. From this, it can be seen that the third beam compensates best for the Rhodamine-B absorption. Interestingly, the output peak intensity in FIG. 9A is smaller than the one observed in FIGS. 9B-9C. For a perfect beam shaping filter, it is impossible to achieve a larger output peak intensity as the attenuation correction mask discussed here has no gain. However, due to the DMD encoding, an apparent amplification resulting from higher diffraction efficiency might be observed for specific masks.

The novel form of Airy function based beams described above exhibit attenuation compensating propagation. It has been experimentally demonstrated that this unique propagation property remains in the finite-energy beam after the spectral truncation of the ideal infinite-energy beams. These beams may find interest in accelerating beam based applications such as imaging, plasmonics and micro manipulation, particularly where the attenuation compensating propagation can be used to obtain a peak intensity that is more uniform than would otherwise be the case across the propagation path of lossy or highly scattering media. As a particular example, the beams could be used in light-sheet microscopy. Preliminary results show an increased contrast of the resulting image in the direction of propagation of the beam, as shown in FIGS. 10A-10D.

Whilst in the example above, the amplitude of the Airy beam has been modulated to compensate for propagation losses, the invention can be applied more generally to sculpt or define the profile of an Airy beam, and also an Airy beam light sheet. This can be done by multiplying the Airy beam spectral function with a spectral modulation function. The spectral modulation function may vary the phase and/or amplitude of the Airy beam spectral function to provide a desired profile. In the specific example described above, the spectral modulation function is an amplitude modulation function represented by $\exp(-b_0 k_x)$.

Figure 11A:
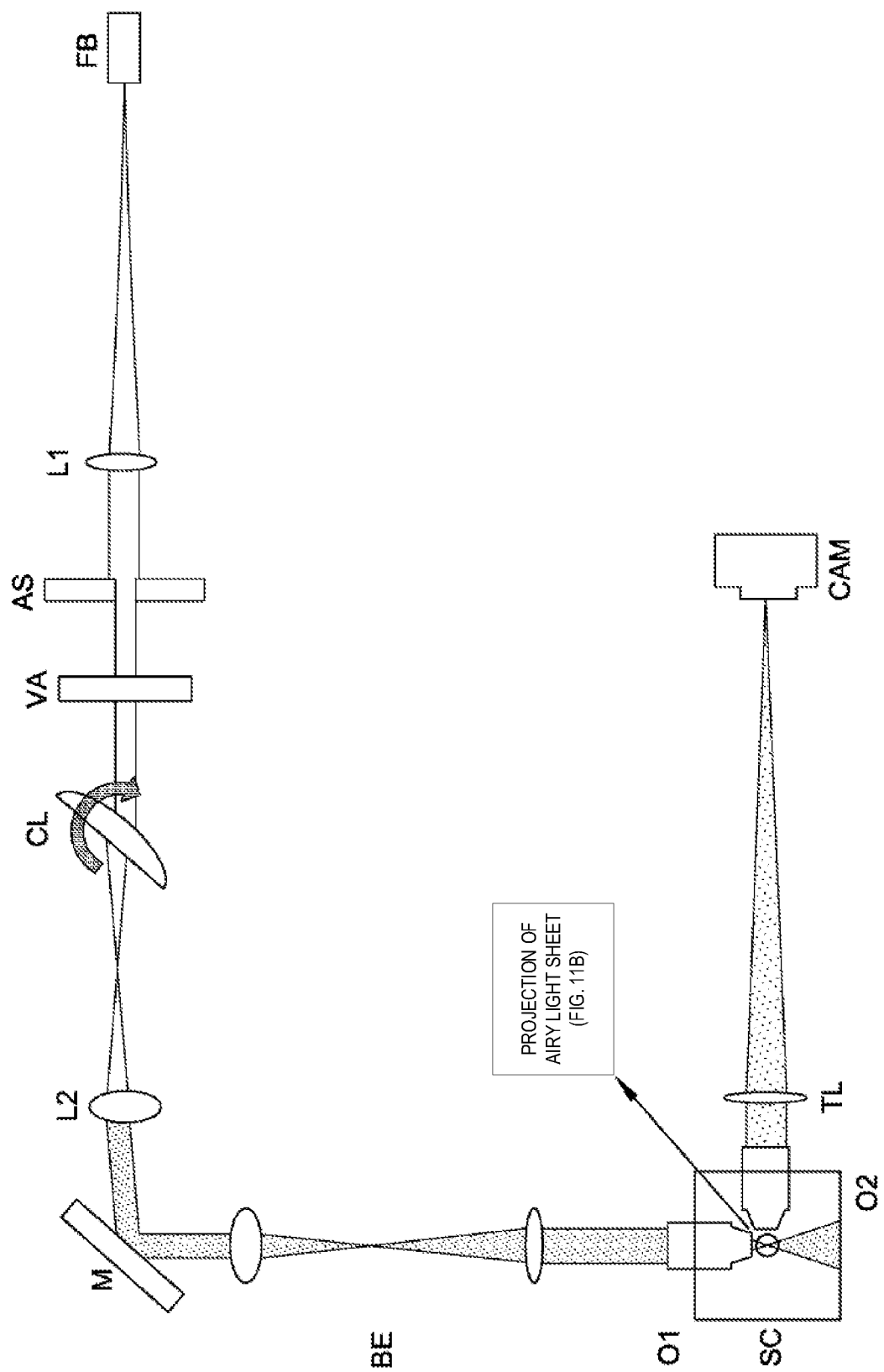
FIG. 11A is a schematic view of a single photon Airy beam light sheet microscope similar to that of FIG. 1A, where a varying attenuator (VA) is placed before the tilted cylindrical lens (CL)
Figure 11B:
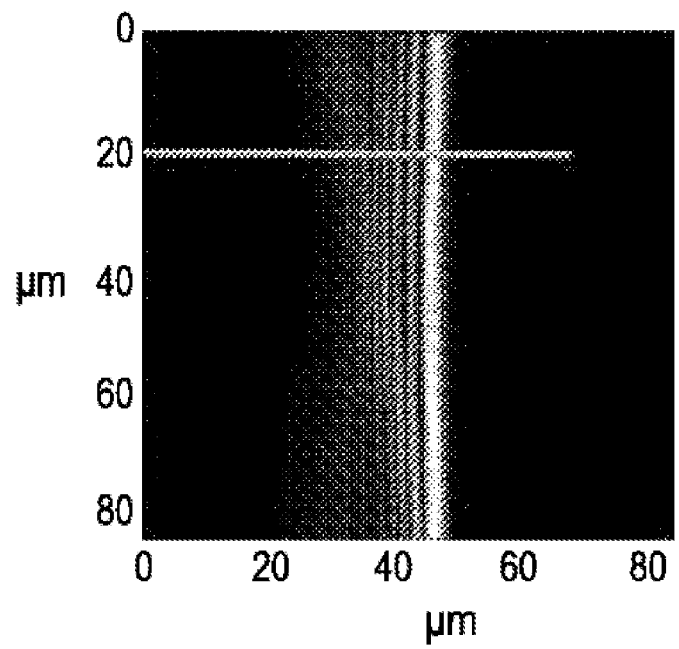
FIG. 11B is a projection of an Airy light sheet generated using the microscope of FIG. 11A.
Figure 11C:
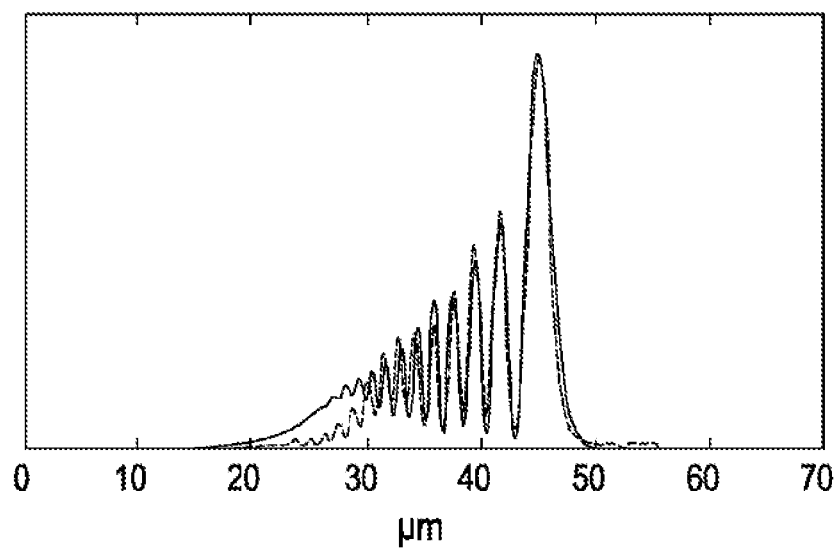
FIG. 11C is a beam profile of a cross section (red line) for FIG. 11B and the corresponding Airy beam profile from a fitted model (blue line).

The Airy field modulation described above can be used in the compact light sheet microscope of FIG. 1A. An example of this is shown in FIGS. 11A-11C. This illustrates a single photon Airy beam light sheet microscope similar to that of FIG. 1A, where a variable attenuator VA is placed before the tilted cylindrical lens CL to introduce an amplitude modulation. This amplitude modulation adds to the cubic modulation introduced by the cylindrical lens CL. The amplitude modulation can be used as described above to modulate the amplitude of the Airy beam light sheet to provide a desired amplitude profile. In particular, the variable attenuator can be arranged to add the exponential amplitude modulation $\exp(-b_0 k_x)$.

A skilled person will appreciate that variations of the order of the steps, processes and disclosed arrangements are possible. For example, whilst the modulated Airy beam light sheet described above has an intensity profile designed to compensate for attenuation or scattering, the modulation technique of the invention could be used to define other profiles along the direction of propagation. For example, an arbitrarily varying attenuation element (VA) could be used to introduce an arbitrary amplitude modulation of the incident beam. Accordingly the above description of the specific embodiment is made by way of example only and not for the purpose of limitation. It will be clear to the skilled person that minor modifications may be made without significant changes to the operation described.

The invention claimed is:

1. A method for generating a modulated Airy beam or a modulated Airy beam light sheet, the method comprising:
   generating a Gaussian beam; and
   imparting, on the Gaussian beam, a cubic phase modulation and a further modulation in phase and/or amplitude, which further modulation is additional to the cubic phase modulation, to thereby convert the Gaussian beam into a modulated Airy beam or a modulated Airy beam light sheet,
   wherein the further modulation in phase and/or amplitude is selected so as to provide the modulated Airy beam or the modulated Airy beam light sheet with an intensity profile that increases in a direction of propagation of the modulated Airy beam or the modulated Airy beam light sheet, or
   wherein the further modulation in phase and/or amplitude is selected so as to at least partially compensate for attenuation or scattering losses experienced by the modulated Airy beam or the modulated Airy beam light sheet during propagation of the modulated Airy beam or the modulated Airy beam light sheet in a lossy medium.

2. A method as claimed in claim 1, comprising:
   multiplying an Airy beam spatial spectral function by a spatial spectral modulation function, thereby to produce the modulated Airy beam or the modulated Airy beam light sheet, wherein the Airy beam spatial spectral function is associated with the cubic phase modulation, and the spatial spectral modulation function is associated with the further modulation in phase and/or amplitude.

3. A method as claimed in claim 1, comprising using a modulation arrangement to impart, on the Gaussian beam, the cubic phase modulation and the further modulation in phase and/or amplitude.

4. A method as claimed in claim 3, wherein the modulation arrangement comprises at least one of a diffractive optical element, a spatial light modulator and a digital micromirror device.

5. A method as claimed in claim 1, comprising using an optical element to impart the cubic phase modulation on the Gaussian beam thereby to convert the Gaussian beam to an Airy beam or an Airy beam light sheet, wherein the optical element is a unitary optical element.

6. A method as claimed in claim 5, wherein the optical element comprises a static optical element and/or a passive diffractive optical element.

7. A method as claimed in claim 5, wherein the optical element comprises a cylindrical lens that is tilted relative to a direction of propagation of the Gaussian beam.

8. A method as claimed in claim 5, comprising using a modulation device or a modulation element to impart the further modulation in phase and/or amplitude of the Airy beam light sheet to provide a desired intensity modulation.

9. A method as claimed in claim 8, wherein the modulation device or the modulation element comprises at least one of a diffractive optical element, a spatial light modulator, a digital micromirror device and a variable attenuator.

10. A method as claimed in claim 8, wherein the modulation device or the modulation element is positioned before the optical element.

11. A method as claimed in claim 1, wherein the further modulation in phase and/or amplitude is selected so as to provide the modulated Airy beam or the modulated Airy beam light sheet with a peak intensity that increases in the direction of propagation of the modulated Airy beam or the modulated Airy beam light sheet.

12. A method as claimed in claim 1, wherein the further modulation in phase and/or amplitude is selected so as to at least partially compensate for attenuation or scattering losses experienced by a peak intensity of the modulated Airy beam or the modulated Airy beam light sheet during propagation of the modulated Airy beam or the modulated Airy beam light sheet in the lossy medium.

13. A method as claimed in claim 2, wherein the spectral modulation function is associated with a modulation in amplitude which is represented by $\exp(-b_0 k_x)$, where $k_x$ represents a wave-vector associated with a direction x which is transverse to a propagation direction z of the modulated Airy beam or the modulated Airy beam light sheet and where $b_0$ is a constant.

14. A method for generating a modulated Airy beam or a modulated Airy beam light sheet, the method comprising:
   generating a Gaussian beam; and
   imparting, on the Gaussian beam, a spatial modulation to thereby convert the Gaussian beam into a modulated Airy beam or a modulated Airy beam light sheet,
   wherein the modulated Airy beam or the modulated Airy beam light sheet is defined by a spectral function which is a function of an Airy beam spectral function multiplied by a spectral modulation function,
   wherein the Airy beam spectral function is associated with a cubic phase modulation, and wherein the spectral modulation function is associated with a further modulation in phase and/or amplitude which is additional to the cubic phase modulation.

15. A method as claimed in claim 14, wherein the spectral modulation function is associated with a modulation in amplitude which is represented by $\exp(-b_0 k_x)$, where $k_x$ represents a wave-vector associated with a direction x which is transverse to a propagation direction z of the modulated Airy beam or the modulated Airy beam light sheet and where $b_0$ is a constant.

16. A method as claimed in claim 14, wherein the further modulation in phase and/or amplitude is selected so as to provide the modulated Airy beam or the modulated Airy beam light sheet with an intensity profile that increases in a direction of propagation of the modulated Airy beam or the modulated Airy beam light sheet.

17. A method as claimed in claim 16, wherein the further modulation in phase and/or amplitude is selected so as to provide the modulated Airy beam or the modulated Airy beam light sheet with a peak intensity that increases in the direction of propagation of the modulated Airy beam or the modulated Airy beam light sheet.

18. A method as claimed in claim 14, wherein the further modulation in phase and/or amplitude is selected so as to at least partially compensate for attenuation or scattering losses experienced by the modulated Airy beam or the modulated Airy beam light sheet during propagation of the modulated Airy beam or the modulated Airy beam light sheet in a lossy medium.

19. A method as claimed in claim 18, wherein the further modulation in phase and/or amplitude is selected so as to at least partially compensate for attenuation or scattering losses experienced by a peak intensity of the modulated Airy beam or the modulated Airy beam light sheet during propagation of the modulated Airy beam or the modulated Airy beam light sheet in the lossy medium.

* * * * *

UNITED STATES PATENT AND TRADEMARK OFFICE
CERTIFICATE OF CORRECTION

PATENT NO. : 10,816,787 B2
APPLICATION NO. : 16/433429
DATED : October 27, 2020
INVENTOR(S) : Michael Mazilu et al.

Page 1 of 1

It is certified that error appears in the above-identified patent and that said Letters Patent is hereby corrected as shown below:

On the Title Page

Please change Item (73) Assignee to:
UNIVERSITY COURT OF THE UNIVERSITY OF ST ANDREWS, St Andrews (GB)

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*